United States Patent
Engelhardt et al.

(10) Patent No.: US 6,496,307 B2
(45) Date of Patent: Dec. 17, 2002

(54) CONFOCAL SCANNING MICROSCOPE

(75) Inventors: Johann Engelhardt, Bad Schoenborn (DE); Heinrich Ulrich, Heidelberg (DE)

(73) Assignee: Leica Microsystems Heidelberg, GmbH, Mannheim (DE)

(*) Notice: Subject to any disclaimer, the term of this patent is extended or adjusted under 35 U.S.C. 154(b) by 0 days.

(21) Appl. No.: 09/770,802

(22) Filed: Jan. 26, 2001

(65) Prior Publication Data

US 2001/0030800 A1 Oct. 18, 2001

(30) Foreign Application Priority Data

Feb. 1, 2000 (DE) .......................... 100 04 233

(51) Int. Cl.[7] .......................... G02B 21/06; G02B 21/00
(52) U.S. Cl. .................. 359/389; 359/368; 359/385
(58) Field of Search .................. 359/368–390; 250/201.3, 216, 234–235, 306–307; 356/345–348, 311, 319, 326

(56) References Cited

U.S. PATENT DOCUMENTS

| 5,127,730 A | * | 7/1992 | Brelje et al. ................ 359/389 |
| 5,241,364 A | * | 8/1993 | Kimura ........................ 356/351 |
| 5,329,352 A | * | 7/1994 | Jacobsen .................... 356/301 |
| 5,386,112 A | * | 1/1995 | Dixon ......................... 250/234 |
| 5,671,085 A | * | 9/1997 | Gustafsson ................. 359/385 |
| 5,760,951 A | * | 6/1998 | Dixon et al. ................ 359/385 |

FOREIGN PATENT DOCUMENTS

| DE | 199 02 625 A1 | 9/1999 |
| EP | 0 627 643 A2 | 12/1994 |

* cited by examiner

Primary Examiner—Thong Nguyen
(74) Attorney, Agent, or Firm—Simpson & Simpson PLLC

(57) ABSTRACT

A confocal scanning microscope, having a light source (1) for illuminating an object (6), which is to be investigated, with exciting light (2), at least two detection channels exhibiting detection light (8, 9) being produced, is configured with regard to a high signal yield and a high signal-to-noise ratio in such a way that at least two detection channels can be optically superimposed by means of a superimposing device (11, 12,13, 15,17, 18).

20 Claims, 5 Drawing Sheets

CONFOCAL SCANNING MICROSCOPE

CROSS-REFERENCE TO RELATED APPLICATIONS

This invention claims priority of a German patent application DE P 100 04 233.3 filed Feb. 1, 2000 which is incorporated by reference herein.

FIELD OF THE INVENTION

The invention relates to a confocal scanning microscope, having a light source for illuminating an object, which is to be investigated, with exciting light, at least two detection channels exhibiting detection light being produced.

BACKGROUND OF THE INVENTION

Microscopes of the type mentioned at the beginning are known in practice and exist in the most varied embodiments. An example of such a microscope is formed by a confocal scanning microscope in the case of which an object to be investigated is scanned with the aid of a light beam or the exciting light. The microscope generally comprises a light source and a focusing optical system with the aid of which the light from the source is focused onto a pinhole stop. In this case, a beam splitter, a scanning device for beam control, a microscope optical system, a detection stop and detectors for detecting detection and/or fluorescent light are provided.

The illuminating light is mostly coupled in via the beam splitter. The focus of the light beam is moved with the aid of the scanning device in a sample plane. For this purpose, it is customary to use two mirrors which are tilted, the deflection axes mostly being perpendicular to one another, such that one mirror deflects in the X-direction and the other deflects in the Y-direction. Tilting of the mirrors is accomplished, for example, with the aid of galvanometer control elements. The fluorescent or reflected light coming from the sample passes in this mostly conventional descanning arrangement via the same scanning mirror back to the beam splitter and passes the latter in order subsequently to be focused onto the detection stop, downstream of which the detectors are located. Detection light which does not originate directly from the focusing region takes a different light path and does not pass the detection stop, and so point information is obtained which leads through scanning of the object to a three-dimensional image. Illumination and detection take place in this case on the objective side, that is to say on sides of the microscope optical system.

It is also possible in a transmitted-light arrangement for the fluorescent light or the transmitted light—the transmission of the exciting light—, for example, to be detected on the condenser side, that is to say on the side of a condenser arranged downstream of the object. The detection-light beam then does not pass via the scanning mirrors to the detector. Such an arrangement is denoted as a non-descanning arrangement.

In order to detect the fluorescent light, there would be a need in the transmitted-light arrangement for a condenser-side detection stop in order—as in the descanning arrangement described—to achieve a three-dimensional resolution. In the case of two-photon excitation, however, it is possible to dispense with a condenser-side detection stop, since the probability of excitation is a function of the square of the photon density or the intensity, which is naturally much higher at the focus than in the neighboring regions. The fluorescent light to be detected therefore originates with high probability in overwhelming proportion from the focusing region, and this renders superfluous further differentiation of fluorescence photons from the focusing region from fluorescence photons from the neighboring regions with the aid of a stop arrangement. However, the detection of the transmitted light and/or the condenser-side detection of the fluorescent light can be helpful in the case of single-photon excitation, as well.

Particularly against the background of a yield of fluorescence photons which is low in any case for two-photon excitation, a non-descanning arrangement in which less light is generally lost on the detection-light path is of interest.

It is known from EP 0 627 643 A1 to raise the signal yield by electronic addition of the signals of the descanning and non-descanning detectors. Two detection channels are thus superimposed electronically in this case.

In the known electronic addition or superimposition of the signals, it is a problem that this form of electronic superimposition of the detector signals is complicated and slow. In particular, the detectors used have to be set in a complicated fashion.

BRIEF SUMMARY OF THE INVENTION

It is therefore the object of the present invention to provide a confocal scanning microscope which achieves a high signal yield and a high signal-to-noise ratio by the use of simple means.

The above object is achieved by a confocal microscope which comprises: a light source defining exciting light for illuminating an object, a scanning device, a first and second detection light being generated in the object wherein the detection light defines at least two detection channels, a superimposing device for optically superimposing the at least two detection channels and a detector assembly with at least one detector for detecting the detection light.

In a way according to the invention, it has firstly been realized that raising the signal yield can be achieved not solely by electronic addition of the signals of the detectors used. Also in a way according to the invention, optical superimposition of at least two detection channels by means of a superimposing device is provided for this purpose. With the microscope according to the invention, it is possible to dispense entirely with vulnerable electronic components which have additionally to be integrated in the known microscope. In this case, the complicated setting of the detectors used is also eliminated. Finally, the optical superimposition provides a quicker superimposition or addition technique than the conventional electronic addition technique.

Consequently, the microscope according to the invention realizes a microscope in which a high signal yield and a high signal-to-noise ratio is achieved by simple means.

In concrete terms, the detection light of at least two detection channels could be detected in a common detector assembly having at least one detector. However, it would also be possible to detect more than two detection channels in a common detector assembly.

The location of the superimposition of the detection light of the respective detection channels is not prescribed in principle. In a structurally particularly simple design, it would be possible, however, for the detection light of the detection channels to be optically superimposed in the detector assembly. In this case, the detection light of the respective detection channels is fed to the detector assembly in a suitable way.

The detector assembly could be a descanning detector assembly, it being rendered possible in a practical way to make use for optical superimposition of a descanning detector assembly frequently already present in a microscope. An additional detector assembly is therefore not required.

The detector assembly could, however, also be a nondescanning detector assembly. It would then be necessary when extending a conventional microscope which originally has a descanning detector assembly to provide a further detector assembly with the aid of which it is then possible to detect the detection light of all the detection channels. In particular, it would be possible thereby for the detection light of at least one detection channel to be guided to the detector assembly before it traverses—as originally planned—a scanning device. For this purpose, the detection light could preferably be guided to the detector assembly by splitting between an objective and the scanning device—from the original beam path. For splitting purposes, a color beam splitter could, in a particularly simple way, be arranged in a beam path of the microscope.

In a concrete refinement, a first detection channel could exhibit detection light which is emitted on the side of the object facing the light source, and a second detection channel could exhibit detection light which is emitted on the side of the object averted from the light source. Expressed more accurately, the first detection channel could exhibit reflected and/or fluorescent light. The second detection channel could, by contrast, exhibit transmitted and/or fluorescent light.

The detector assembly could be assigned to the first detection channel. In other words, it could be a detector assembly which is already present in the descanning arrangement in the case of a conventional microscope.

With regard to a concrete superimposition of two detection channels, the detection light of the second detection channel could be guided to the detector assembly by means of the superimposing device. This case could, in particular, concern an already present descanning detector assembly.

In an alternative refinement, both the detection light of the first detection channel and the detection light of the second detection channel could be guided to the detector assembly by means of the superimposing device. In this case, the detector assembly could be a detector assembly which is provided specifically for the superimposing technique and which is, if appropriate, implemented in addition to a descanning detector assembly already present. The detector assembly could be a nondescanning detector assembly, in particular.

With regard to effective optical superimposition of the detection channels, it could be possible to detect reflected light of the first detection channel and transmitted light of the second detection channel jointly, preferably in one and the same detector. Reflected light of the first detection channel and transmitted light of the second detection channel could in this case be approximately in the same wavelength region.

Furthermore, with reference to effective superimposition of the detection channels, fluorescent light of the first detection channel and fluorescent light of the second detection channel could be detected jointly, preferably in one and the same detector. Fluorescent light of the first detection channel and fluorescent light of the second detection channel could in this case be approximately in the same wavelength region.

Depending on the number of wavelength regions to be detected, it would be possible to provide a plurality of detectors which could then detect different wavelength regions.

The superimposing device could have a light-guiding device in order to ensure reliable superimposition of the detection channels. In a structurally particularly simple way, the light-guiding device could have an optical fiber. Glass fibers, in particular, can be used in this case. In particular, the light-guiding device could have an optical conductor filled with a liquid.

In an alternative refinement, the light-guiding device could have at least one mirror. One or more lenses could be assigned to the mirror or the mirrors. This renders it possible to construct mirror/lens arrangements which likewise permit reliable light guidance.

With regard to a particularly selective detection of the detection light, the detector assembly could be assigned a light-splitting device for splitting the detection light into different wavelength regions. The light-splitting device could have at least one color beam splitter in a particularly simple way.

As an alternative or addition hereto, the light-splitting device could have at least one partially transparent mirror. A bandpass or blocking filter could be arranged downstream of this mirror or these mirrors. In the case of the use of mirrors as splitting component, as well, it would also be possible to arrange a plurality of such mirrors in series, if appropriate with a downstream bandpass or blocking filter. Splitting the fluorescent light into a plurality of spectral regions is also possible thereby.

As an alternative to the use of color beam splitters or mirrors, it would be possible to use for splitting purposes a multiband detector. Splitting the fluorescent light into a plurality of spectral regions is also possible with the aid of such a multiband detector.

A laser could be used in a particularly advantageous way as light source. However, it is also conceivable to use other suitable light sources.

BRIEF DESCRIPTION OF THE SEVERAL VIEWS OF THE DRAWINGS

There are various possibilities of configuring and developing the teaching of the present invention in an advantageous way. For this purpose, reference is made to the drawing. In the drawing.

DETAILED DESCRIPTION OF THE INVENTION

Figure 1:
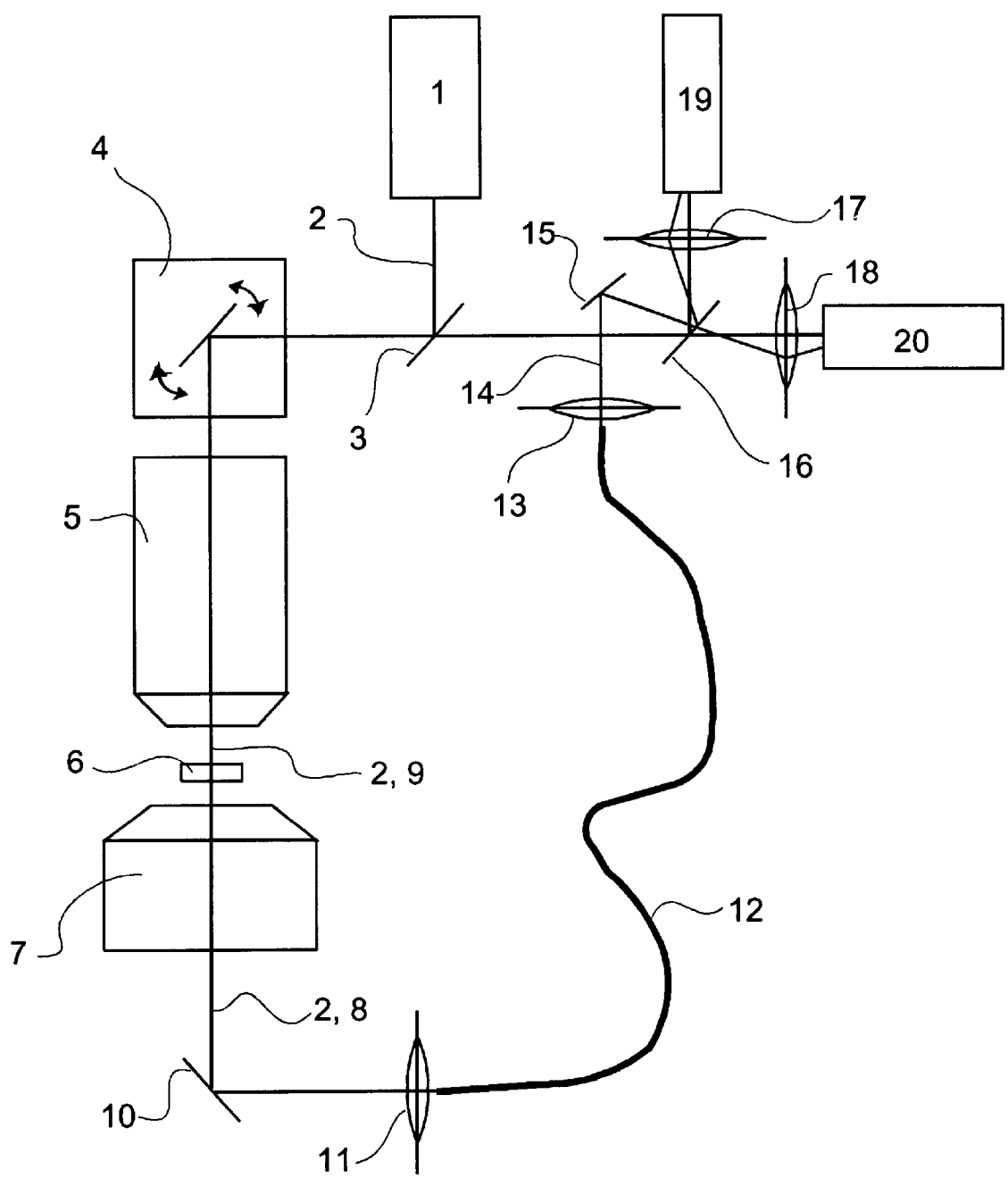
FIG. 1 shows a diagrammatic illustration of a first exemplary embodiment of a microscope according to the invention.

FIG. 1 shows a first exemplary embodiment of a microscope according to the invention in a diagrammatic illustration. The microscope is a confocal laser scanning microscope. The microscope has a light source 1 designed as a laser. The light source 1 emits exciting light 2 which is reflected to a scanning device 4 via a main beam splitter 3. The scanning device 4 leads the exciting light beam through a microscope optical system or an objective 5 via an object 6. Transmitted light passing through the object 6 and fluorescent light produced in the object 6 pass through a condenser 7, forming a condenser-side detection light 8 in the process. Exciting light 2 reflected by the object 6 and fluorescent light produced in the object 6 form an objective-side detection light 9.

Furthermore, the condenser-side detection light 8 reaches via a deflecting mirror 10 a launching optical system 11 which launches the detection light 8 into an optical fiber 12. Provided at the end of the optical fiber 12 is an output optical system 13 from which there emerges output detection light 14 which is reflected to a color beam splitter 16 via a mirror 15. Also reflected onto the color beam splitter 16 is the objective-side detection light 9, which is guided via the scanning device 4. In other words, the detection light 9 passes via a descanning light path.

The color beam splitter 16 reflects the spectrally lower-wave region of the light to a detector 19 via a focusing optical system 17. The spectrally higher-wave component of the detection light reaches a detector 20 via a focusing optical system 18. Use is made in this case of a descanning detector assembly which has two detectors 19 and 20 and is already present in the case of conventional microscopes of the type mentioned at the beginning.

In the exemplary embodiment illustrated in FIG. 1, the transmitted light and the fluorescent light emitted at the rear of the object are guided to the already present detectors 19 and 20 with the aid of an optical fiber 12 and detected there together with the reflected and fluorescent light running via the scanning device 4.

Use is made in this case of two detectors 19 and 20, light of different wavelengths being fed to the detectors 19 and 20 with the aid of a color beam splitter 16. The wavelength regions of the transmitted light guided to a detector or the fluorescent light emitted at the rear of the object preferably correspond in this case to the wavelength region of the reflected or fluorescent light to be detected with this detector.

In other words, a microscope is implemented which has a light source 1 which uses exciting light 2 to illuminate an object 6 to be investigated, at least two detection channels exhibiting detection light 8 and 9 being produced. In this case, one detection channel exhibits detection light 8, and the other exhibits detection light 9. With regard to a high signal yield and a high signal-to-noise ratio, the microscope is configured in such a way that at least two detection channels can be optically superimposed by means of a superimposing device. In accordance with FIG. 1, in concrete terms the superimposing device has a launching optical system 11, an optical fiber 12, an output optical system 13, a mirror 15, a focusing optical system 17 and a focusing optical system 18.

The spectrally lower-wave region of the fluorescent light of the detection light 8 and the detection light 9 is optically superimposed in the detector assembly. Moreover, the transmitted light and the reflected light are optically superimposed in the detector assembly.

Figure 2:
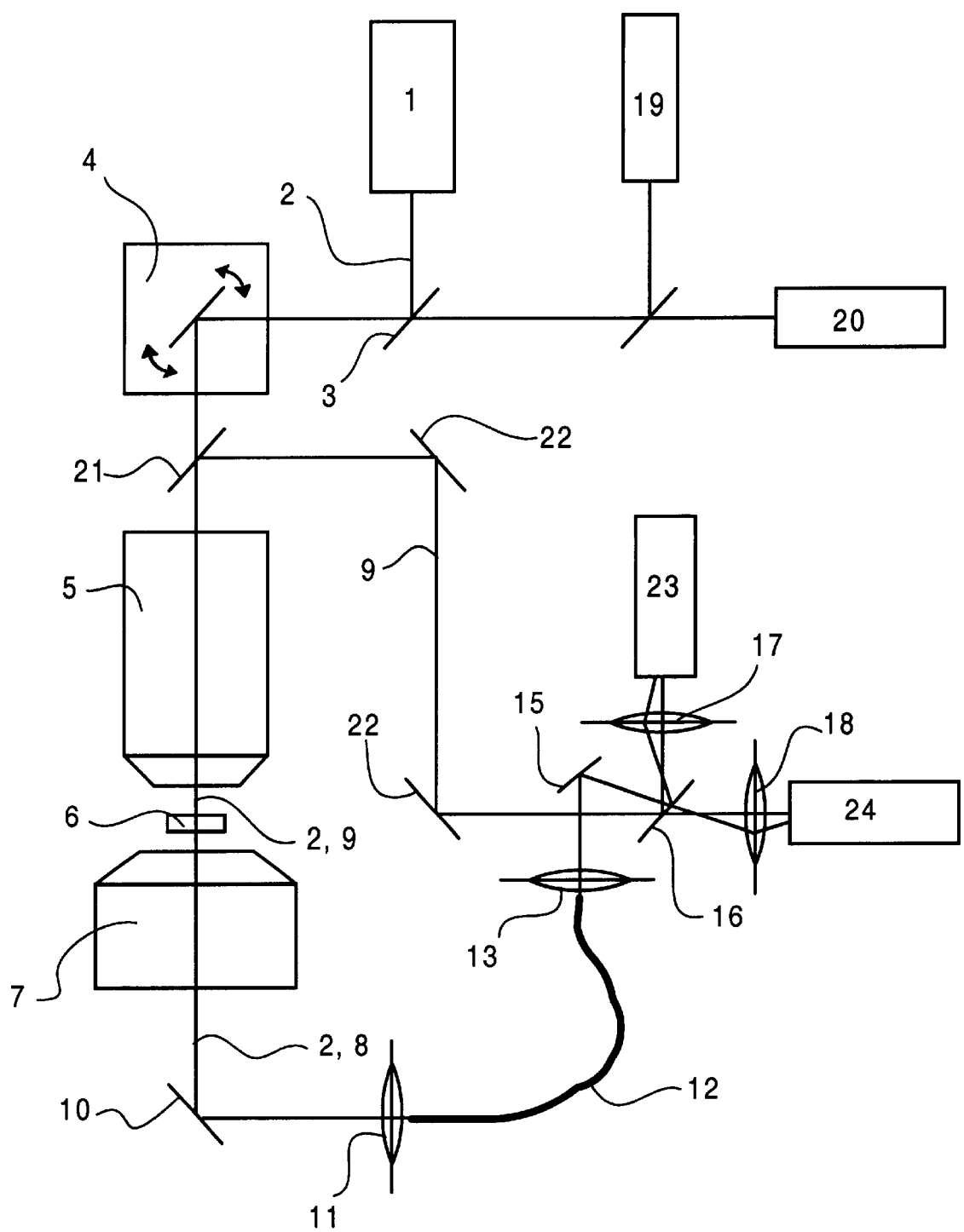
FIG. 2 shows a diagrammatic illustration of a second exemplary embodiment of a microscope according to the invention, with a separate non-descanning detector assembly.

FIG. 2 shows a diagrammatic side view of a second exemplary embodiment of a microscope according to the invention. In essential parts, the microscope corresponds to the first exemplary embodiment already shown in FIG. 1. For this reason, identical components of the two exemplary embodiments are marked with the same reference numerals.

The second exemplary embodiment shown in FIG. 2 is a microscope with an additional non-descanning detector assembly. Before it traverses the scanning device 4, detection light 9 is guided in this case from a first detection channel to the non-descanning detector assembly. Arranged for this purpose between the scanning device 4 and the objective 5 is a color beam splitter 21 which outputs the detection light 9 from the original beam path.

Provided for further guidance of the detection light 9 are mirrors 22 which lead the detection light 9 emitted on the objective side further to the color beam splitter 16 into the detector assembly. The coupling of the detection light 8, which is emitted on the condenser side and exhibits transmission light and fluorescent light produced in the object 6, is performed by analogy with the first exemplary embodiment shown in FIG. 1. Instead of the detectors 19 and 20 used in the first exemplary embodiment, detectors 23 and 24 are used in the exemplary embodiment shown in FIG. 2.

In the case of the optical superimposition of the detection channels, a combination is implemented which makes use, on the one hand, of an optical fiber 12 and, on the other hand, of a mirror arrangement with mirrors 22.

Figure 3:
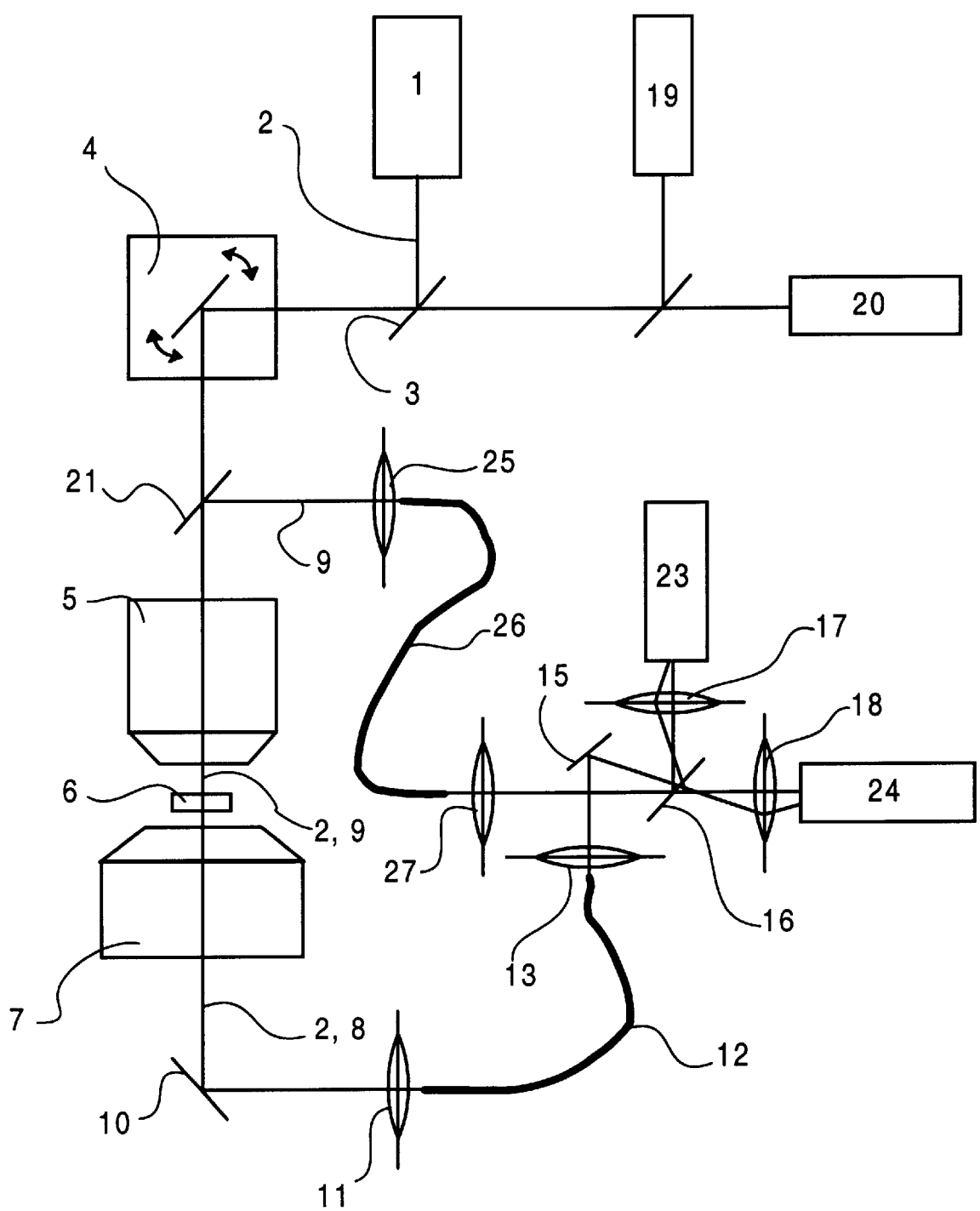
FIG. 3 shows a diagrammatic illustration of a third exemplary embodiment of a microscope according to the invention, with a separate non-descanning detector assembly.

FIG. 3 shows a diagrammatic illustration of a third exemplary embodiment of a microscope according to the invention. The third exemplary embodiment shown in FIG. 3 is designed by analogy with the second exemplary embodiment shown in FIG. 2. The single difference consists in that the detection light 9 emitted on the objective side is guided to the non-descanning detector assembly via a launching optical system 25, an optical fiber and an output optical system 27—instead of via mirrors. Otherwise, the design of the third exemplary embodiment corresponds to the design of the second exemplary embodiment.

The detectors 19 and 20 are not used both in the second exemplary embodiment and in the third exemplary embodiment.

Figure 4:
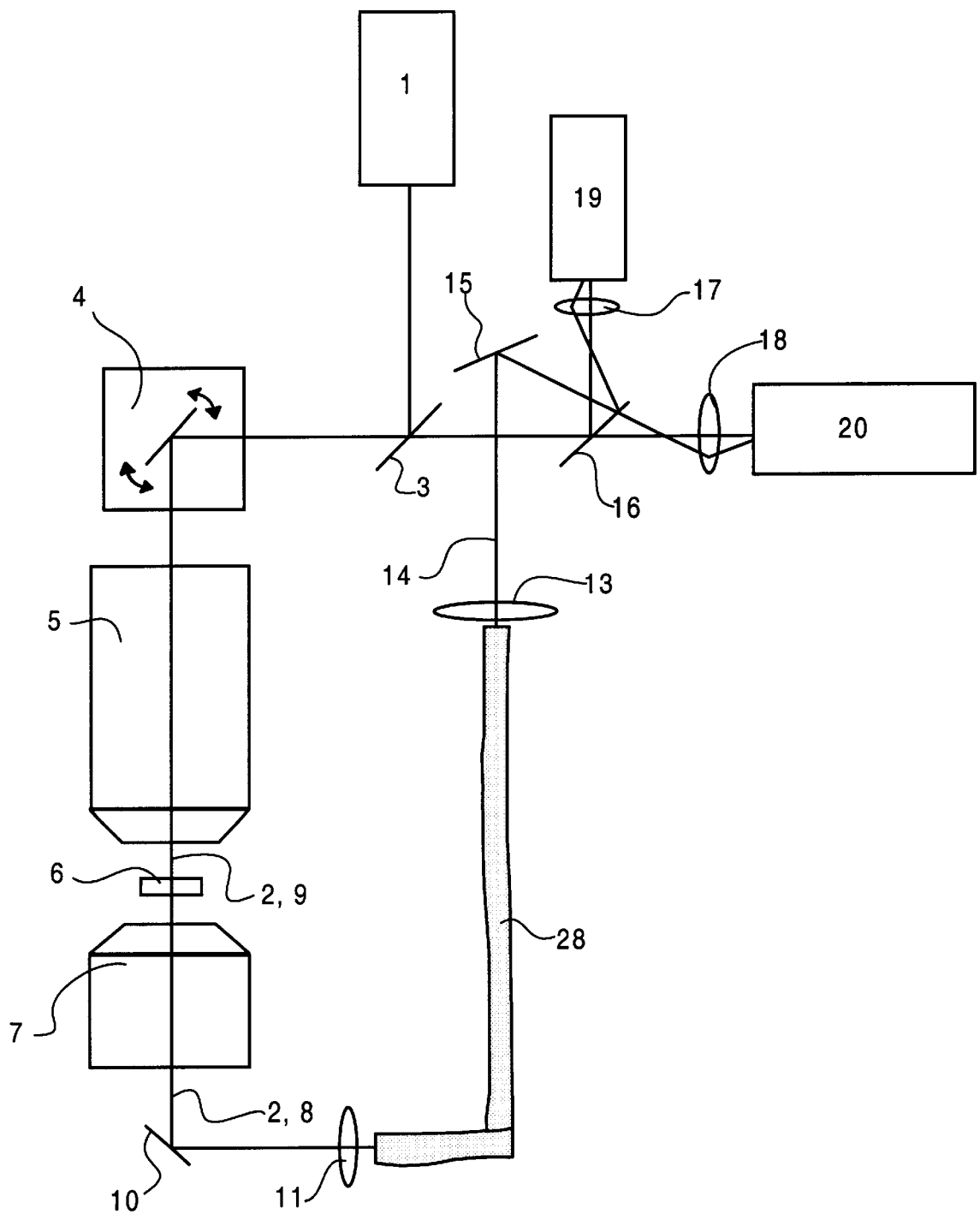
FIG. 4 shows a diagrammatic illustration of another exemplary embodiment of a microscope according to the invention, with a liquid-filled optical conductor.

The launching and output optical systems 11, 13, 25 and 27 usually have lenses. FIG. 4 shows an optical conductor 28 filled with liquid. Liquid-filled optical conductor 28 preferably has a large numerical aperture. Such light-guiding devices are flexible and easy to handle. In concrete terms, a light-launching optical system 11 and a light-output optical system 13 are assigned to the optical conductor 28 filled with the liquid.

In the first exemplary embodiment shown in FIG. 1, the superimposing device is formed by the launching optical system 11, the optical fibre 12, the output optical system 13, the mirror 15, the focusing optical system 17 and the focusing optical system 18. In the second exemplary embodiment shown in FIG. 2, these components are further joined by the color beam splitter 21 and the mirrors 22. In the third exemplary embodiment shown in FIG. 3, by comparison with the second exemplary embodiment shown in FIG. 2, in the case of the superimposing device the mirrors 22 are replaced by the launching optical system 25, the optical fiber 26 and the output optical system 27.

Figure 5:
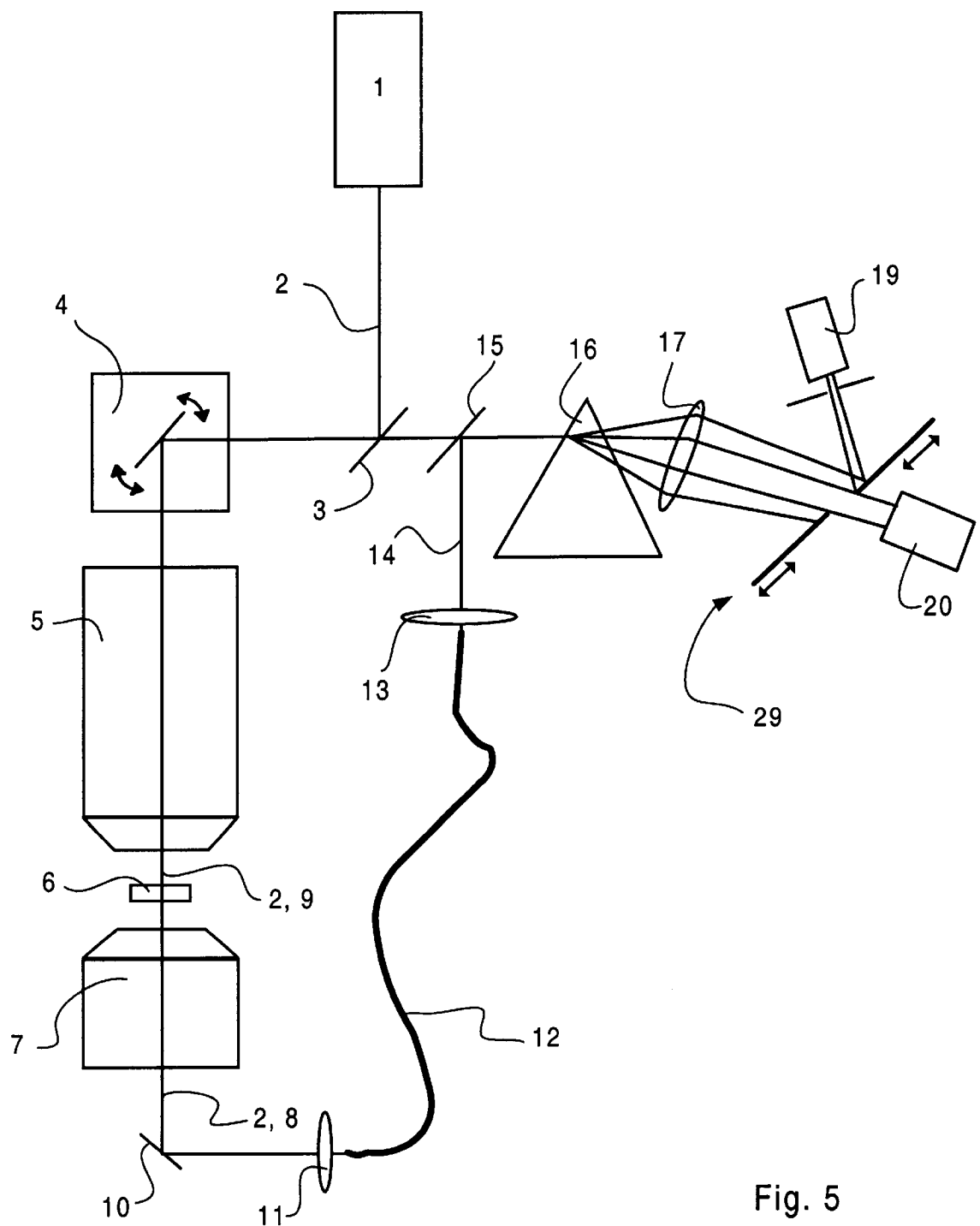
FIG. 5 shows a diagrammatic illustration of yet another exemplary embodiment of a microscope according to the invention that includes a multiband detector.

As an alternative to the use of color beam splitters or mirrors, it would be possible, as shown in FIG. 5, to use for splitting purposes a multiband detector 29 which is described, for example, in DE 199 02 625 A1. Splitting the fluorescent light into a plurality of spectral regions is also possible with the aid of such a multiband detector.

Parts List

1 Light source
2 Exciting light

3 Main beam splitter
4 Scanning device
5 Objective
6 Object
7 Condenser
8 Condenser-side detection light
9 Objective-side detection light
10 Mirror
11 Launching optical system
12 Optical fiber
13 Output optical system
14 Output detection light
15 Mirror
16 Color beam splitter
17 Focusing optical system
18 Focusing optical system
19 Detector
20 Detector
21 Color beam splitter
22 Mirror
23 Detector
24 Detector
25 Launching optical system
26 Optical fiber
27 Output optical system
28 Liquid-filled optical conductor
29 multiband detector 29

What is claimed is:

1. A confocal scanning microscope comprising an objective (5) and a condenser on opposite sides of an object (6), a light source (1) defining exciting light (2) for illuminating said object (6), a scanning device (4), a condenser-side detection light (8) and an objective-side detection light (9) being generated in the object (6) wherein the condenser-side detection light (8) and the objective-side detection light (9) define at least two detection channels, a superimposing device (11, 12, 13, 15, 17, 18, 21, 22, 25, 26, 27) for optically superimposing the at least two detection channels at a location outside an optical path connecting said scanning device and said object, a detector assembly with at least one detector (19, 20; 23, 24) for detecting the condenser-side detection light (8) and the objective-side detection light (9), and at least one means located in the optical path connecting said scanning device and said detector assembly for directing the detection light to said superimposing device.

2. Confocal scanning microscope according to claim 1, wherein the condenser-side detection light (8) and the objective-side detection light (9) of the detection channels is optically superimposed in the detector assembly.

3. Confocal scanning microscope according to claim 1, wherein the detector assembly is a descanning detector assembly.

4. Confocal scanning microscope according to claim 1, wherein the detector assembly is a non-descanning detector assembly.

5. Confocal scanning microscope according to claim 1, wherein a beam splitter (21) is provided between the objective (5) and the scanning device (4) for guiding the objective-side detection light (9) to the detector assembly.

6. Confocal scanning microscope according to claim 1, wherein the objective-side detection light (9), defining a first detection channel, is emitted on the side of the object (6) facing the light source (1), and the condenser-side detection light (8), defining a second detection channel, is emitted on the side of the object (6) averted from the light source (1).

7. Confocal scanning microscope according to claim 6, wherein the detector assembly is assigned to the first detection channel.

8. Confocal scanning microscope according to claim 6, characterized in that the condenser-side detection light (8) of the second detection channel is guided to the detector assembly by means of the superimposing device (11, 12, 13, 15, 17,18).

9. Confocal scanning microscope according to claim 6, wherein both the objective-side detection light (9) of the first detection channel and the condenser-side detection light (8) of the second detection channel are guided to the detector assembly by means of the superimposing device (11, 12, 13, 15, 17, 18, 21, 22, 25, 26, 27).

10. Confocal scanning microscope according to claim 1, wherein a plurality of detectors (19, 20, 23, 24) are provided.

11. Confocal scanning microscope according to claims 1, wherein the superimposing device (11, 13, 15, 17, 18, 21, 22, 25, 26, 27) has a light-guiding device.

12. Confocal scanning microscope according to claim 11, wherein the light-guiding device is an optical fiber (12, 26).

13. Confocal scanning microscope according to claim 11, wherein the light-guiding device is optical conductor filled with a liquid.

14. Confocal scanning microscope according to claim 13, wherein the optical conductor filled with the liquid has a large numerical aperture.

15. Confocal scanning microscope according to claim 11, characterized in that a light-launching optical system (11, 25) and a light-output optical system (13, 27) are assigned to the light-guiding device.

16. Confocal scanning microscope according to claim 1, wherein a light-splitting device for splitting the condenser-side and objective-side detection light (8, 9) into different wavelength regions is assigned to the detector assembly.

17. Confocal scanning microscope according to claim 16, wherein the light-splitting device has at least one color beam splitter (16).

18. Confocal scanning microscope according to claim 17, wherein the light-splitting device has at least one partially transparent mirror.

19. Confocal scanning microscope according to claim 16, wherein the light-splitting device has a multiband detector.

20. Confocal scanning microscope according to claim 1, wherein the light source (1) is a laser.

* * * * *